United States Patent
Shinozaki

(10) Patent No.: US 6,827,117 B1
(45) Date of Patent: Dec. 7, 2004

(54) ADHESIVE TAPE AND POSITIONING APPARATUS FOR APPLYING THE TAPE

(75) Inventor: Mitsuhiko Shinozaki, Minoo (JP)

(73) Assignee: Kansai Paint Co., Ltd., Hyogo (JP)

( * ) Notice: Subject to any disclaimer, the term of this patent is extended or adjusted under 35 U.S.C. 154(b) by 87 days.

(21) Appl. No.: 10/048,350

(22) PCT Filed: Jul. 27, 2000

(86) PCT No.: PCT/JP00/05007

§ 371 (c)(1),
(2), (4) Date: Jan. 25, 2002

(87) PCT Pub. No.: WO01/07313

PCT Pub. Date: Feb. 1, 2001

(30) Foreign Application Priority Data

Jul. 28, 1999 (JP) .......................................... 11-213883

(51) Int. Cl.⁷ ........................... B31B 31/00; B60J 10/00
(52) U.S. Cl. ...................... 156/391; 156/60; 156/486; 156/540; 156/574; 156/579; 428/40.1; 428/343
(58) Field of Search ......................... 156/60, 391, 486, 156/540, 574, 579; 428/40.1, 343

(56) References Cited

U.S. PATENT DOCUMENTS 5,641,378 A * 6/1997 Luhman et al. .............. 156/577
5,820,725 A * 10/1998 Maeda et al. ................ 156/391
6,098,685 A * 8/2000 Maeda ......................... 156/391
6,508,287 B1 * 1/2003 Shinozaki et al. ........... 156/391
6,554,040 B1 * 4/2003 Cueff et al. .................. 156/391

FOREIGN PATENT DOCUMENTS

| JP | 2000-118322 | 4/2000 |
|----|-------------|--------|
| JP | 2000-159165 | 6/2000 |

* cited by examiner

Primary Examiner—William P. Watkins, III
Assistant Examiner—Brian P. Egan
(74) Attorney, Agent, or Firm—Knobbe Martens Olson & Bear LLP

(57) ABSTRACT

A positioning apparatus for applying adhesive tape to the surface of vertical members of automobile door sashes is disclosed. The apparatus includes a main body with a vertical member contact portion and a horizontal member contact portion. An engagement portion includes a plurality of engagement projections to engage with through-holes in the adhesive tape. A holding member holds a horizontal member between itself and the horizontal member contact portion of the main body using the restoring force of a spring. The holding member is attached to the main body in a manner such that it can swing up and down.

9 Claims, 5 Drawing Sheets

[Fig. 1]
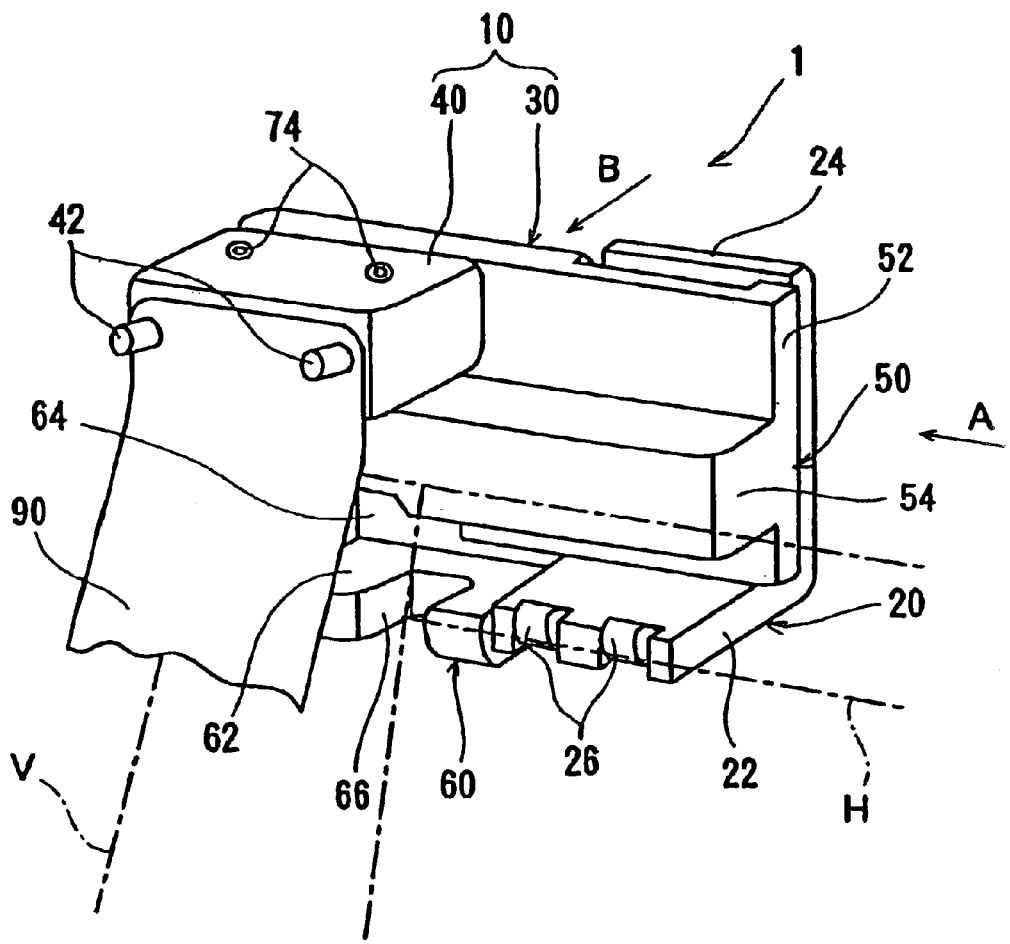

[Fig. 2]
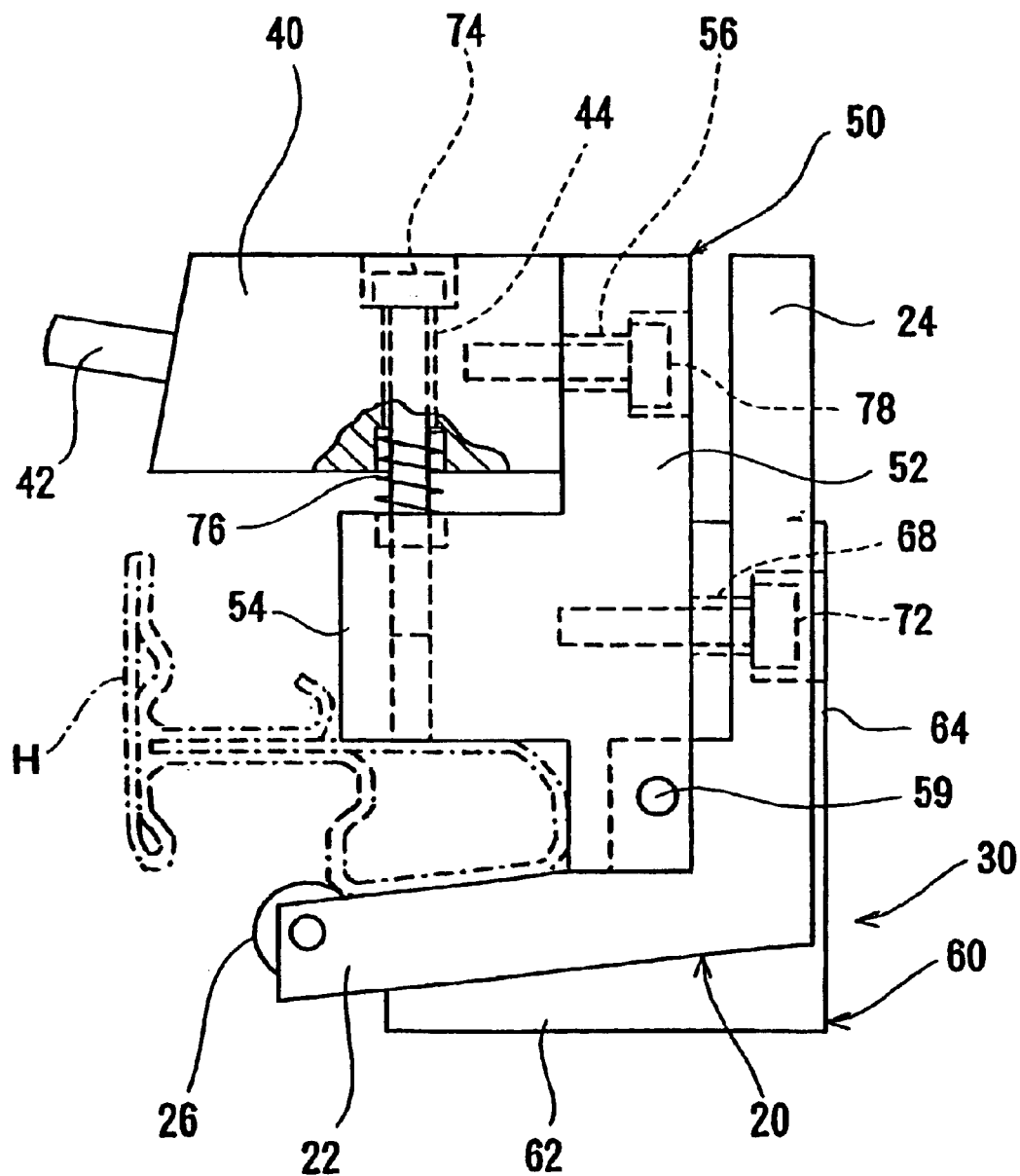

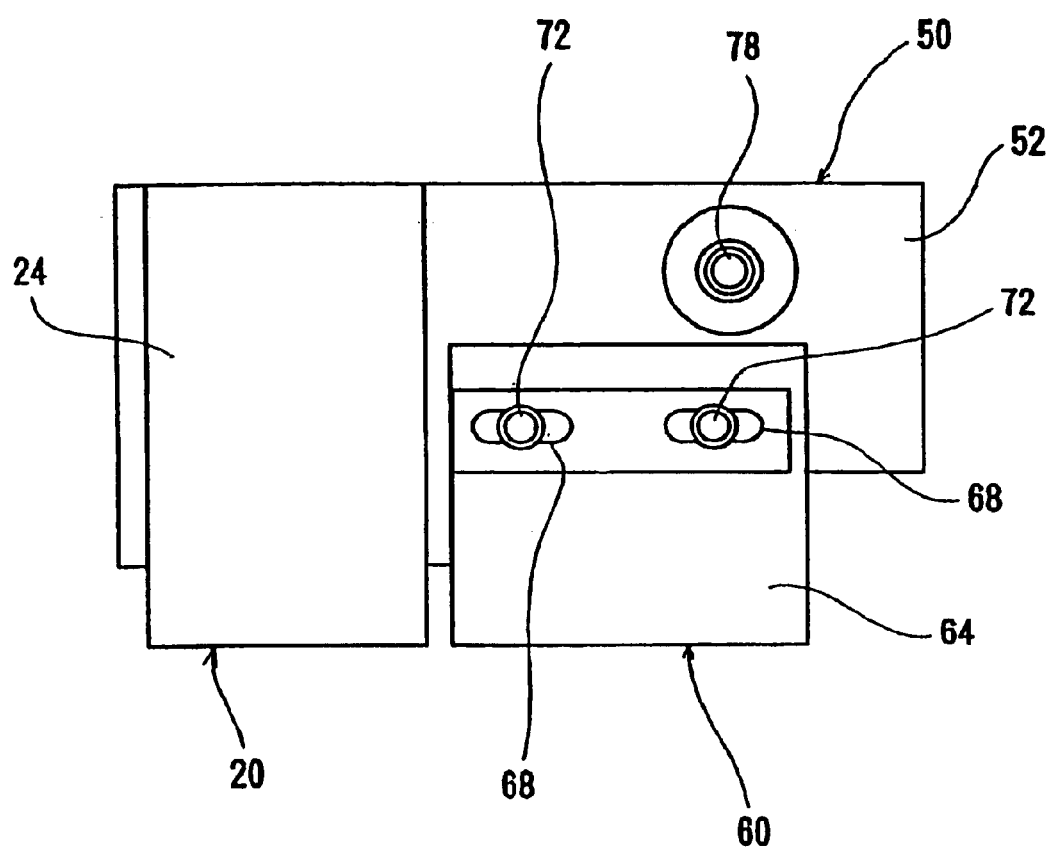
[Fig. 3]

[Fig. 4]
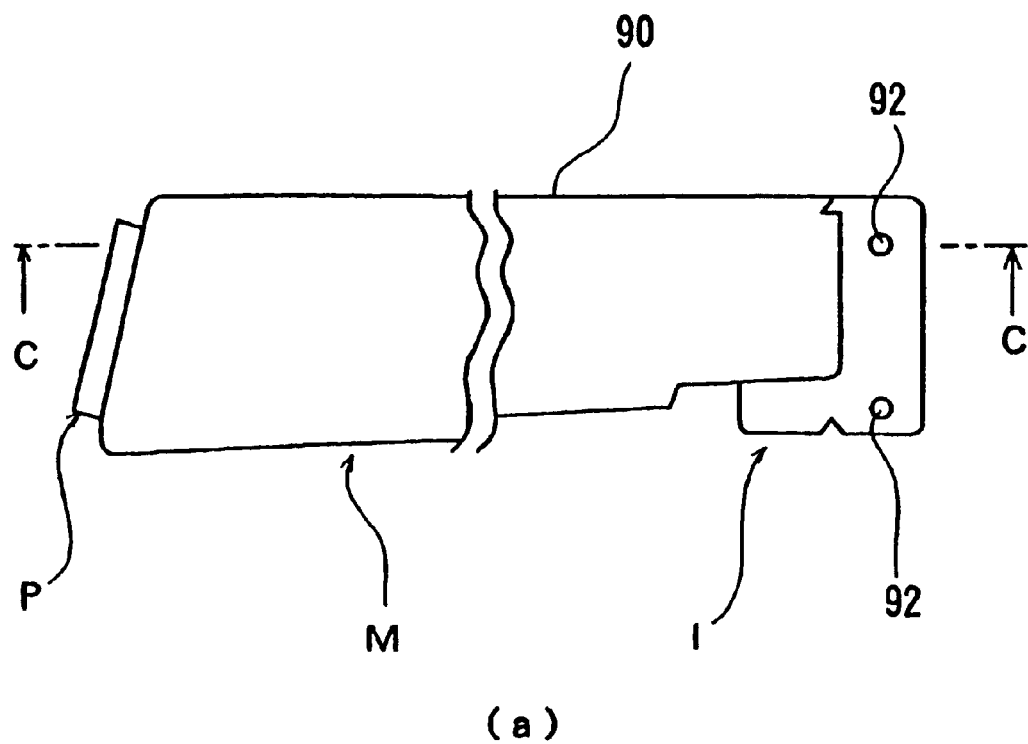
(a)
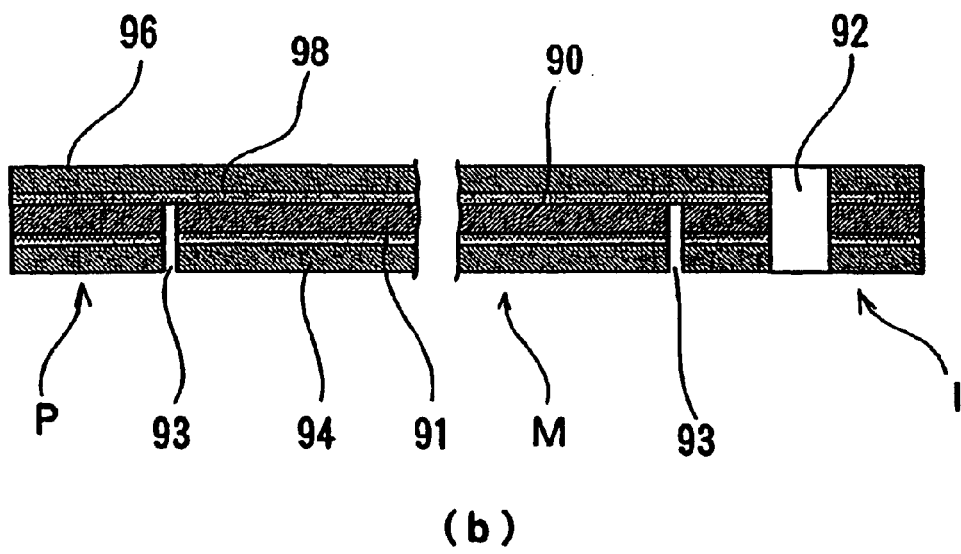
(b)

[Fig. 5] PRIOR ART
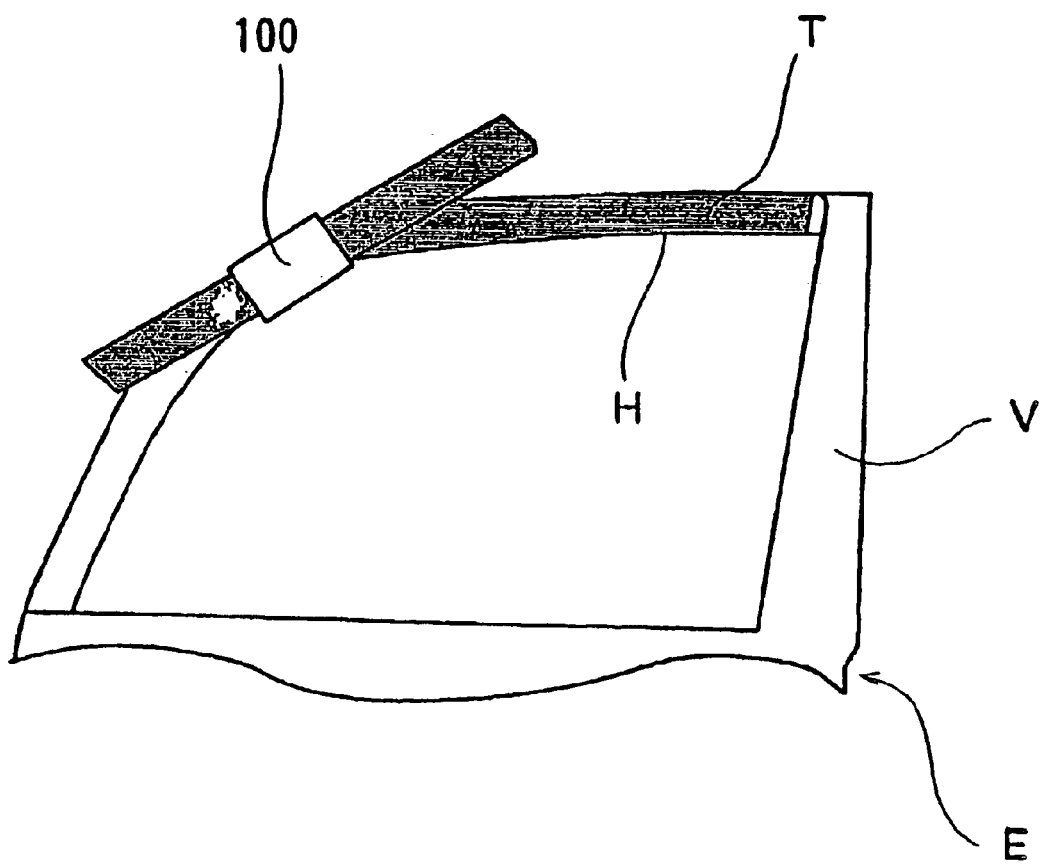

ADHESIVE TAPE AND POSITIONING APPARATUS FOR APPLYING THE TAPE

This application is the U.S. National Phase under 35 U.S.C. §371 of International Application PCT/JP00/05007, filed Jul. 27, 2000, which claims priority to Japanese Patent Application No. 1999-213883, filed Jul. 28, 1999. The International Application was published under PCT Article 21(2) in a language other than English.

TECHNICAL FIELD

The present invention relates to an adhesive tape to be applied to the surface of vertical members of automobile door sashes and a positioning apparatus for applying the tape.

BACKGROUND ART

Conventionally, automobile door sashes have been painted black or other colors in order to improve their appearance. However, painting not only requires additional manufacturing steps such as masking but also risks causing environmental problems due to the evaporation of solvent into the atmosphere. Recently, to overcome these problems, colored adhesive tape made of vinyl chloride is being used instead of painting. The application of such adhesive tapes is generally carried out in the following manner. A skilled worker, using only the naked eye, attaches one end of the adhesive tape to a specific portion of the door sash, and then presses the tape along the sash with a squeegee or the like.

Japanese Unexamined Patent Publication No. 338627/1993 describes a tape positioning apparatus 100 which facilitates the application of an adhesive tape to a door sash as shown in FIG. 5. The mechanism of this tape positioning apparatus 100 is as follows. A horizontal member H of a door sash is tightly held between two guide members (not shown) and the tape positioning apparatus 100 is moved along the horizontal member H in the direction of the arrow to apply an adhesive tape T.

However, in the case of applying an adhesive tape by hand, one must decide the positioning and direction of the adhesive tape relative to the door sash based on visual observation. In this case, one needs to carefully position the adhesive tape relative to the vertical member while comparing both ends of the adhesive tape. Such work requires considerable time and can not be sped up in order to shorten the cycle time of the production line.

The above-mentioned tape positioning apparatus 100 also has problems. Since the two guide members are at a fixed distance from each other, the tape positioning apparatus is compatible with the constant width horizontal member H but not with the vertical member V which has a gradually-changing width.

DISCLOSURE OF INVENTION

To solve these problems, the present invention was made. An object of the present invention is to provide an adhesive tape which can be quickly, easily and accurately applied to the surface of vertical members of door sashes. Another object is to provide a positioning apparatus for applying the tape.

To achieve these objects, the present invention provides a positioning apparatus for applying an adhesive to the surface of vertical members of automobile door sashes, which comprises:

a main body having a vertical member contact portion and a horizontal member contact portion which contact with go the inner surface of the vertical member and the inner surface of the horizontal member, and an engagement portion having a plurality of engagement projections to engage with a plurality of through-holes in the adhesive tape and arranged to be positioned above the vertical member through contact between the vertical member contact portion and the vertical member and between the horizontal member contact portion and the horizontal member;

a holding member swingably mounted on the main body to tightly hold the horizontal member between itself and the horizontal member contact portion by the force of a spring; and an adjustment means for adjusting the position and inclination of the engagement portion relative to the surface of the vertical member.

Preferably, the main body of the positioning apparatus comprises an engagement member having the engagement portion, a support member having the vertical member contact portion and the horizontal member contact portion, and the holding member mounted on the support member. Preferably, the adjustment means comprises an elastic body interposed between the engagement member and the support member, and a plurality of bolts with which the engagement member is fixed to the support member opposing the elastic force of the elastic body.

The adjustment means may have a structure enabling positional adjustment of the vertical member contact portion relative to the horizontal member contact portion.

Preferably, the holding member is roughly L-shaped when seen from the side and comprises a holding board portion for tightly holding the horizontal member between itself and the horizontal member contact portion and an operation board portion mounted in a roughly perpendicular direction relative to the holding board; the L shaped holding member is pivotally supported at its corner by the main body and when the operation board and the main body are pinched together against the force of the spring, the space between the holding board and the horizontal member contact portion is increased.

Preferably, the holding board is provided with rollers at the front edge.

By using these positioning apparatuses of the invention, an adhesive tape can be applied quickly and accurately as compared with the application of the same tape by hand because the adjustment means of these positioning apparatuses facilitates the positioning and directional adjustment of the adhesive tape during the attachment of one end of the tape, whereas in conventional manual procedures, positioning must be accomplished by comparing the ends of the adhesive tape.

In addition, using these positioning apparatuses, adhesive tape can easily be applied even to a vertical member having a gradually-changing width, which is difficult to achieve with conventional positioning apparatuses.

The adhesive tape applied to the surface of vertical members of a door sash using the positioning apparatus has a protective film releasably attached to the outer surface and an adhesive layer formed on the inner surface. The adhesive tape comprises three separate portions consisting of a main portion to be attached to the surface of the vertical members, a fitting portion having a plurality of through-holes to engage with the plurality of engagement projections and positioned above the main portion, and a positioning portion having a contour matching the portion of the door near the base of the vertical member and positioned below the main portion, the three portions being integrated by means of a protective film applied.

This adhesive tape has the following advantage. After the main portion is applied to the vertical member using said positioning apparatus, the unnecessary portions, i.e., the fitting portion and the positioning portion, can be easily removed along with the protective film.

BRIEF DESCRIPTION OF DRAWINGS

FIG. 1 is a perspective view showing an adhesive tape and a positioning apparatus for applying the tape of the present invention.

FIG. 2 is a side view of the positioning apparatus shown in FIG. 1, seen in the arrow A direction.

FIG. 3 is a back view of the positioning apparatus shown in FIG. 1, seen in the arrow B direction.

FIG. 4 (a) is a plan view of the adhesive tape shown in FIG. 1. FIG. 4 (b) is a sectional view taken along line C—C.

FIG. 5 illustrates use of a conventional positioning apparatus for applying adhesive tape.

BEST MODE FOR CARRYING OUT THE INVENTION

Preferred embodiments of the positioning apparatus of the present invention are described below referring to the attached drawings. FIG. 1 to FIG. 3 illustrate an embodiment of the positioning apparatus of the invention. FIG. 1 is a perspective view thereof, FIG. 2 is a side view thereof and FIG. 3 is a back view thereof.

As shown in FIG. 1, the positioning apparatus comprises a main body 10 and a holding member 20 attached thereto, the main body 10 comprising a support member 30 and an engagement member 40.

The support member 30 comprises a horizontal member holder 50 and a vertical member holder 60. The horizontal member holder 50 comprises a base plate 52 and a contact block 54 projecting from the surface of the base plate 52 to contact with the horizontal member H on inner surface of the door sash. The vertical member holder 60 is roughly L-shaped as seen from the side and comprises a bottom plate 62 and a side plate 64. The bottom plate 62 has an engagement groove 66 which is engaged with the inner side of the vertical member V of a door sash frame. As shown in FIGS. 2 and 3, the side plate 64 has two horizontally long holes 68. Two horizontal positioning bolts 72 are passed through the long holes 68 so that the vertical member holder 60 can be moved in the horizontal direction (crosswise direction in FIG. 3) for adjustment and fixed to the base plate 52.

The front side of engagement member 40 has two engagement projections 42 projected slightly upward relative to the horizontal direction. The adhesive tape 90 described below is hung on the engagement projections 42 over the vertical member V. As shown in FIG. 2, the engagement member 40 has two through-holes 44 in the vertical direction (in FIG. 2) and is fixed to the contact block 54 by means of two vertical positioning bolts 74 which are loosely inserted into the through-holes 44 and screwed into the contact block 54. Coil springs 76 are provided around the vertical positioning bolts 74 in a compressed state between the engagement member 40 and the contact block 54. The engagement member 40 is fixed to a base plate 52 by means of a bolt 78 which is loosely inserted into the through-hole 56 formed on the base plate 52 and screwed into the engagement member 40. The position and direction, relative to the vertical member V, of the adhesive tape 90 hung on the engagement projections 42 can be adjusted by means of the horizontal positioning bolts 72, vertical positioning bolts 74, coil springs 76 and fixing bolt 78; these parts constitute an adjustment means.

The holding member 20 comprises a holding board portion 22 and an operation board portion 24 integrally formed and is roughly L-shaped when seen from the side.

The holding member 20 is swingably supported via a torsion spring (not shown) on a shaft 59 at the lower portion of the base plate 52. At least one roller 26 is mounted at the front edge of the holding board portion 22.

The adhesive tape 90 comprises a black base material made of vinyl chloride. As shown in FIG. 4(a), the adhesive tape 90 has a band-like shape whose width is slightly larger than that of the corresponding part of the vertical member V. As shown in the sectional view of FIG. 4(b), the adhesive tape 90 has on the outer surface a transparent application film (protective film) 96 releasably attached with an adhesive layer 98, and has on the inner surface an adhesive layer 91 covered by release paper 94. Formed at one end of the adhesive tape 90 is a fitting portion I having two through-holes 92 to engage with engagement projections 42. Formed at the other end is a positioning portion P which matches the corner portion of the door outer panel near the base of the vertical member V (portion E in FIG. 5). A main portion M is disposed between the fitting portion I and positioning portion P. The fitting portion I, main portion M and positioning portion P are separated from each other by slits 93 made only in the release paper 94 and the adhesive tape 90 and integrated by means of an application film 96 applied to the outer surface.

Use of the positioning apparatus 1 is described below. First, an operator pinches the operation board 24 and base plate 52 of the holding member 20 to increase the space between the holding board 22 and the contact block 54. The bottom surface of the contact block 54 is brought into contact with the inner surface of the horizontal member H, whereas the engagement groove 66 is engaged with the inner surface of the vertical member V. Thereafter, when the operator releases the operation board 24 and base plate 52, the horizontal member H is tightly held between the contact block 54 and the holding board 22 by means of a torsion spring (not shown) and securely retained between the base plate 52 and the rollers 26. Thus the positioning apparatus 1 is fixed to the inner side of the door sash frame, and the engagement projections 42 are positioned above the vertical member V.

Then the through-holes 92 of the adhesive tape 90 are fitted onto the engagement projections 42. With approximately half of the release paper 94 being separated from the main portion M of the adhesive tape 90, the positioning portion P of the adhesive tape 90 is positioned against the corner portion E of the door outer panel. When the positioning portion P does not precisely match with the corner portion E, the positioning portion P is positioned using one hand, while adjusting the position and direction of the adhesive tape 90 using the other hand. To vertically shift the adhesive tape 90 or adjust the direction of the adhesive tape 90 relative to the vertical member V, the fixing bolt 78 is first loosened. Then one or both of the vertical positioning bolts 74 are loosened or tightened so that the engagement members 42 can be moved up and down or tilted. After the adhesive tape 90 is precisely adjusted to the desired position and direction, the fixing bolt 78 is tightened again to fix the engagement member 42. To horizontally shift the adhesive tape 90, the horizontal positioning bolts 72 are first loosened and the horizontal member holder 50 is slid in the horizontal direction relative to the vertical member holder 60 and then the horizontal positioning bolts 72 are fixed again.

After the adhesive tape 90 is precisely positioned relative to the vertical member V, the exposed adhesive surface 91 of the main portion M is applied to the vertical member V by pressing the tape with a squeegee, etc. The position and direction of the adhesive tape 90 are thereby precisely decided. Then the release paper 94 is entirely separated from the main portion M in order to apply the rest of the main portion M to the vertical member V.

Next, the positioning apparatus 1 is detached from the door sash. The application film 96 is peeled off of the adhesive tape 90, along with the fitting portion I and the positioning portion P. Finally, the extra portions of the adhesive tape extending in the width direction of the vertical member V are folded back to the reverse side of the vertical member V, thus completing the application.

Using the positioning apparatus 1, the position and direction of the adhesive tape 90 relative to the vertical member V can be easily modified through the adjustment of the positioning means, i.e., the horizontal positioning bolts 72, vertical positioning bolts 74 and fixing bolt 78, after the positioning apparatus 1 is fixed to the door sash by means of the holding member 20 and the adhesive tape 90 is engaged with the engagement projections 42. Therefore, the adhesive tape 90 can be quickly applied to the variously shaped door sashes of different models or types of vehicles. Quick application is also possible when the welded state of the automobile door, attached state of the tape positioning apparatus 1, etc. are variable.

Since coil springs 76 are interposed between the engagement member 40 and the contact block 54, the engagement member 40 can be shifted or tilted by loosening or tightening the vertical positioning bolts 74. Therefore, the position and direction of the adhesive tape 90 are easily adjustable.

The positioning apparatus 1 can be easily attached to or detached from the door sash by pinching the base plate 52 and the operation board 24 of the holding member 20.

Since the holding board 22 of the holding member 20 and the contact block 54 tightly hold the inner surface of the horizontal member H and are not brought into contact with the outer surface of the horizontal member H, there is no risk of damaging an adhesive tape already attached to the outer surface of the horizontal member H.

The rollers 26 mounted at the front edge of the holding board 22 facilitate the attaching and detaching of the tape positioning apparatus 1. Moreover, since the horizontal member H is retained between the rollers 26 and the base plate 52, the positioning apparatus 1 is more securely fixed.

The adhesive tape 90 comprises a fitting portion I, a main portion M and a positioning portion P, i.e., three separate portions which are integrated by means of an application film 96. Therefore, after the main portion M is applied to the vertical member V, the fitting portion I or the positioning portion P is pulled to peel off the application film 96, so that the portions other than the main portion M can be easily removed.

One of the preferred embodiments of the invention is presented above. It is to be understood that the invention is not limited thereto and thereby.

For example, the vertical member contact portion according to the above embodiment of the present invention is an engagement groove 66 both sides of which are brought into contact with the vertical member V to horizontally position. However, in place of such an engagement groove 66, the positioning apparatus may comprise a vertical member contact portion which is brought into contact with only one side of the vertical member V in the horizontal direction.

In the above embodiment, coil springs 76 are interposed between the support member 30 and the engagement member 40. However, it is also possible to interpose elastic plate-like members made of rubber, etc. instead of the coil springs 76. It is not necessary to fix the engagement member 40 with the fixing bolt 78 when the elastic force of these elastic members is sufficiently high.

In the above embodiment, the horizontal member holder 50 is slidably connected to the vertical member holder 60 so that the adhesive tape 90 can be horizontally positioned relative to the vertical member V. Instead of such construction, horizontally long through-holes 74, 56 may be formed in the engagement member 40 and base plate 52, whereby the engagement member 40 is horizontally slidable relative to the support member 30. With this construction, it becomes unnecessary to separate the horizontal member holder 50 and the vertical member holder 60, which can be integrally formed.

It is also possible to form vertically long holes at the base end portions of the two horizontally long holes 68, whereby the vertical member holder 60 is horizontally and vertically slidable relative to the horizontal member holder 50. With this construction, it becomes unnecessary to separate the support member 20 and the engagement member 30, which can be integrally formed.

What is claimed is:

1. A positioning apparatus for applying adhesive tape to the surface of the tape application side of a vertical member of an automobile door sash, which comprises:
    a main body having
        a vertical member holder with a contact portion configured to make contact with the vertical member of an automobile door sash on a side opposite to the tape application side,
        a horizontal member holder with a contact portion configured to make contact with the horizontal member of the automobile door sash on the side opposite to the tape application side, and
        an engagement portion having a plurality of engagement projections to engage with a plurality of through-holes in the adhesive tape, the engagement portion being positioned relative to the contact portion of the vertical member holder and the contact portion of the horizontal member holder so as to be above the vertical member of the automobile door sash when the contact portion of the vertical member holder and the contact portion of the horizontal member holder are in contact with the vertical member and the horizontal member of the automobile door sash respectively;
    a holding member for holding the horizontal member of the automobile door sash between itself and the contact portion of the horizontal member holder by the restoring force of a spring, the holding member attached to the main body in such a manner that the holding member can swing up and down; and
    an adjustment means for adjusting the position and inclination of the engagement portion relative to the surface of the vertical member of the automobile door sash.

2. The positioning apparatus according to claim 1 wherein the adjustment means enables positional adjustment of the contact portion of the vertical member holder relative to the horizontal member holder.

3. The positioning apparatus according to claim 2 wherein the holding member is L-shaped when seen from the side and comprises a holding board for holding the horizontal member of the automobile door sash between itself and the contact portion of the horizontal member holder and an operation board mounted in a perpendicular direction relative to the holding board and the holding member is pivotally supported at its corner by the main body; and the apparatus being configured such that when the operation board and the main body are pinched together against the force of the spring, the space between the holding board and the contact portion of the horizontal member holder is increased.

4. The positioning apparatus according to claim 1 wherein the holding member comprises a holding board for holding the horizontal member of the automobile door sash between itself and the contact portion of the horizontal member holder and an operation board mounted on and substantially perpendicularly to the holding board, the holding member being L shaped when seen from the side and pivotally supported at its corner by the main body; and the apparatus being configured in such a manner that the space between the holding board and the contact portion of the horizontal member holder is increased by pinching the operation board and the main body together against the restoring force of the spring.

5. The positioning apparatus according to claim 4 wherein the holding board is provided with at least one roller at the front edge.

6. The positioning apparatus according to claim 1 wherein the main body further comprises an engagement member which includes the engagement portion, a support member which includes the vertical member holder and the horizontal member holder, and wherein the holding member is mounted on the support member; and wherein the adjustment means comprises an elastic body interposed between the engagement member and the support member, and a plurality of bolts which fix the engagement member to the support member opposing the elastic force of the elastic body.

7. The positioning apparatus according to claim 6 wherein the adjustment means enables positional adjustment of the contact portion of the vertical member holder relative to the horizontal member holder.

8. The positioning apparatus according to claim 6 wherein the holding member is L-shaped when seen from the side and comprises a holding board for holding the horizontal member of the automobile door sash between itself and the contact portion of the horizontal member holder and an operation board mounted in a perpendicular direction relative to the holding board and the holding member is pivotally supported at its corner by the main body; and the apparatus being configured such that when the operation board and the main body are pinched together against the force of the spring, the space between the holding board and the contact portion of the horizontal member holder is increased.

9. An adhesive tape which is applied to the surface of vertical members of a door sash using the positioning apparatus of any one of claims 1–5, the adhesive tape having a protective film releasably attached to the outer surface and an adhesive layer formed on the inner surface, the adhesive tape comprising three separate portions consisting of a main portion to be attached to the surface of the vertical members, a fitting portion having a plurality of through-holes to engage with the plurality of engagement projections and positioned above the main portion, and a positioning portion having a contour matching the portion of the door near the base of the vertical member and positioned below the main portion, and the fitting portion, the main portion and the positioning portion being integrated by means of the protective film applied.

* * * * *